March 7, 1961   H. E. WALKER   2,973,548
MECHANISM FOR ORIENTING FISH
Filed July 24, 1958
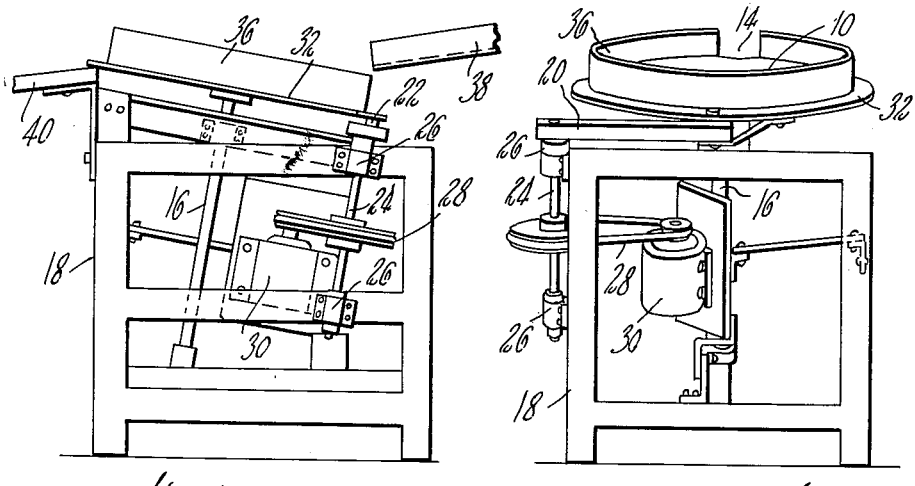
Fig. 1.   Fig. 2.
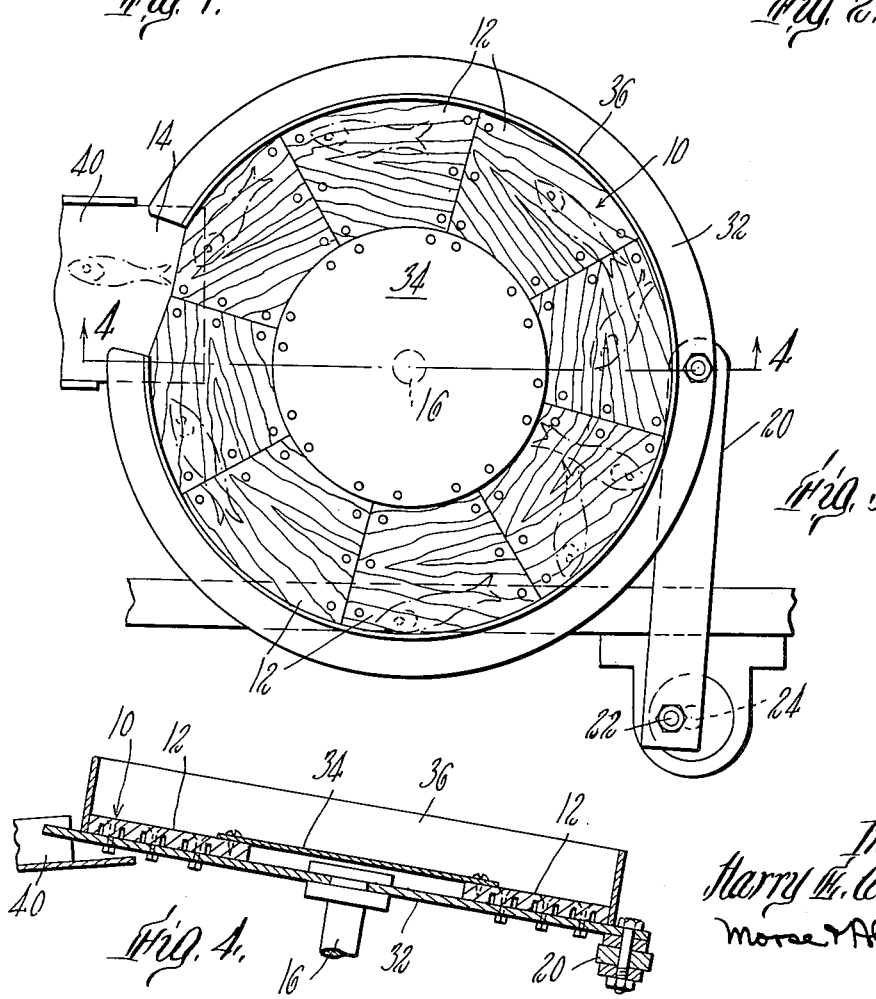
Fig. 3.
Fig. 4.
Inventor
Harry E. Walker
Morse & Altman
Attys.

United States Patent Office 2,973,548
Patented Mar. 7, 1961

2,973,548

MECHANISM FOR ORIENTING FISH

Harry E. Walker, 112 Court St., Bath, Maine

Filed July 24, 1958, Ser. No. 750,664

4 Claims. (Cl. 17—2)

This invention relates to mechanism for orienting fish which are being transported from a tank or other source to a machine for decapitating them as a step in the process of preparing the fish for canning. In feeding the fish to a cutting machine for removing their heads, it is very important that the fish be presented in the same direction. If some of them are reversed, the wrong end is cut and the fish becomes waste. The mechanism hereinafter described operates rapidly and almost infallibly to advance the fish supplied thereto so that all of them are discharged therefrom in the same direction, that is, head first. For this purpose, the fish are deposited on vibrating wooden surfaces on which the fiber ends of the wood project at an angle and act as ratchet teeth to engage the edges of the fish scales so that the fish will advance thereon in the head-first direction only. For a more complete understanding of the invention reference may be had to the following description thereof and to the drawing of which—

Figure 1 is a side elevation of mechanism embodying the invention;

Figure 2 is an end elevation of the same;

Figure 3 is a plan view, on a larger scale, of part of the mechanism shown in Figures 1 and 2;

Figure 4 is a section on the line 4—4 of Figure 3.

The mechanism consists essentially of a disc or annulus 10 composed of slabs 12 of wood, preferably oak, which have the shape of truncated sectors, as shown in Figure 3. The slabs are fitted together to form a complete circle, but the individual slabs are arranged with reference to the direction of the grain of the wood so that the fiber ends of the wood at the upper faces of the slabs point in the direction of a discharge port 14 at the rim of the disc 10, that is, the fibers at the top faces of the slabs on one half of the disc extend generally in the same direction, while the fibers at the top faces of the slabs on the other half of the disc extend generally in the opposite direction, the fibers on both halves of the disc facing the discharge port 14. The disc is mounted on a shaft 16 which is inclined to the vertical on a frame 18 so that the disc, being at right angles to the shaft, is inclined with reference to the horizontal, the high point of the disc being at the discharge port 14. Attached to the disc 10 at its low point is a pitman 20 which extends tangentially from the disc and is connected to a crank 22 mounted on a shaft 24 which turns in a bearing 26 on the frame 18. The shaft 24 is connected by pulleys and a belt 28 to an electric motor 30 which is mounted beneath the disc 10 on the frame 18. The motor 30 reciprocates the pitman 20 through a short stroke (e.g., ⅞″) but at a high frequency, 1,000 oscillations per minute being desirable. This results in rapid rotary oscillations of the disc 10 through a small angle.

The slabs 12 are bolted or otherwise secured to an aluminum disc 32, a central aluminum plate 34 being secured to the inner margins of the top faces of the slabs. The slabs are surrounded by a guard rail 36 which is upstanding and which extends all the way around the slabs except for a gap at the discharge port 14.

The fish may be supplied to the oscillating disc by any suitable means such as a chute 38 which deposits the fish on the low portion of the disc. The disc is kept wet by the wet fish which are deposited on it so that although the slabs 12 may be smoothly sanded before installation, the ends of the fibers at the top faces tend to rise when the slabs are wet. The fiber ends, being at an angle to the face of each slab, act as ratchet teeth and engage the outer edges of the scales of the fish to advance the fish as the disc is rapidly oscillated. Such advance motion is always in the direction of the head of the fish. The disc offers two passages from its low part to its high part and the fish advance to the right or the left of the center of the disc in accordance with the direction they are pointed when deposited on the disc. The tilt of the disc makes it necessary for the disc to propel the fish toward the discharge port without the aid of gravity so that only those fish which are pointed toward the discharge port 14 can reach that port. As the fish reach the discharge port 14 they pass through it head first onto a discharge chute 40 on which they slide to a cutting machine for removal of their heads.

I claim:

1. Mechanism for orienting fish comprising an annular disc composed of slabs of wood, an upstanding rail at the circumference of said disc, said rail having a discharge port therein, means for rapidly oscillating said disc through a small angle about its axis, said slabs of wood having the fibers thereof on one half of the disc extending in generally the same direction, while the fibers on the other half of the disc extend generally in the opposite direction, the fibers on both halves of the disc facing said discharge port, and a frame on which said disc and means are mounted.

2. Mechanism for orienting fish comprising a slightly tilted disc composed of slabs of wood, an upstanding rail at the circumference of said disc, said rail having a discharge port therein, said slabs of wood having the fibers thereof on one half of the disc extending in generally the same direction, while the fibers on the other half of the disc extend generally in the opposite direction, the fibers on both halves of the disc facing said discharge port, means for rapidly oscillating said disc through a small angle about its axis, and a frame on which said disc and means are mounted.

3. Mechanism for orienting fish, comprising a frame, a slightly tilted disc mounted on said frame, said disc being composed of slabs of wood, an upstanding rail at the circumference of said disc, said rail having a discharge port therein, said slabs of wood having the fibers thereof on one half of the disc extending in generally the same direction, while the fibers on the other half of the disc extend generally in the opposite direction, the fibers on both halves of the disc facing said discharge port, means for rapidly oscillating said disc through a small angle about its axis, said means including a pitman attached to said disc at the low point thereof and extending tangentially out therefrom, a crank shaft mounted on said frame, a crank on said shaft connected to said pitman, and means for rotating said shaft.

4. Mechanism for orienting fish, comprising a frame, a shaft mounted on said frame at a small angle to the vertical, a tilted disc on the upper end of said shaft perpendicular to the axis thereof, said disc having an annular surface of wood, a guard rail on said disc surrounding said annular surface except in the vicinity of the high point of the disc providing a discharge port, said slabs of wood having the fibers thereof on one half of the disc extending in generally the same direction, while the fibers on the other half of the disc extend generally in the opposite direction, the fibers on both halves of the disc facing said discharge port, and means on said frame for rapidly oscillating said disc through a small angle about its axis.

References Cited in the file of this patent

UNITED STATES PATENTS

| | | |
|---|---|---|
| 1,290,090 | Cole | Jan. 7, 1919 |
| 1,718,812 | Doney | June 25, 1929 |
| 1,893,903 | Mullins | Jan. 10, 1933 |
| 1,967,229 | Drevitson | July 24, 1934 |
| 2,672,647 | Haber | Mar. 23, 1954 |

FOREIGN PATENTS

| | | |
|---|---|---|
| 77,930 | Norway | Jan. 15, 1951 |